United States Patent [19]

Grenzebach

[11] Patent Number: 4,881,364
[45] Date of Patent: Nov. 21, 1989

[54] SEPARATING DEVICE FOR REAPERS WITH CUTTER PLATES DRIVEN TO ROTATE ABOUT VERTICAL AXES

[75] Inventor: Hans Grenzebach, Gemunden, Fed. Rep. of Germany

[73] Assignee: Friedrich Mortl Schleppergerate Bau GMBH & Co. KG., Gemunden, Fed. Rep. of Germany

[21] Appl. No.: 225,893

[22] Filed: Jul. 29, 1988

Related U.S. Application Data

[63] Continuation-in-part of Ser. No. 892,844, Aug. 4, 1986, abandoned.

[51] Int. Cl.⁴ ............................................. A01D 63/00
[52] U.S. Cl. .......................................... 56/314; 56/192
[58] Field of Search ................ 56/6, 13.6, 13.7, 13.8, 56/192, 314, 315, DIG. 2

[56] References Cited

U.S. PATENT DOCUMENTS

| | | | |
|---|---|---|---|
| 3,043,081 | 7/1962 | Sandall | 56/314 |
| 3,596,454 | 8/1971 | Kluck | 56/314 |
| 4,050,224 | 9/1977 | Oosterling et al. | 56/192 X |
| 4,099,369 | 7/1978 | Oosterling et al. | 56/314 |
| 4,117,653 | 10/1978 | Tarver, Jr. | 56/192 X |
| 4,330,982 | 5/1982 | Vissers et al. | 56/192 |
| 4,428,181 | 1/1984 | van Staveren et al. | 56/192 X |

FOREIGN PATENT DOCUMENTS 1196727 7/1970 United Kingdom ................ 56/192

Primary Examiner—William P. Neuder
Attorney, Agent, or Firm—Thomas & Kennedy

[57] ABSTRACT

A separating device for reapers with cutter plates driven to rotate about vertical axes having a fender which is inclined downward to divert reaping material. The fender is arranged to be fastened to the reaper at a point below the cuting plane of the cutter and rearwardly of the vertical plane defined by the axes of the cutter plates, and inside of the cutting track defined by the outermost cutting plate. The fender is inclined upwardly from the fastening point and passes through the cutting plane of the cutter plates behind the vertical plane of the cutter axes, and within the cutting track defined by the outermost cutter plate.

12 Claims, 2 Drawing Sheets

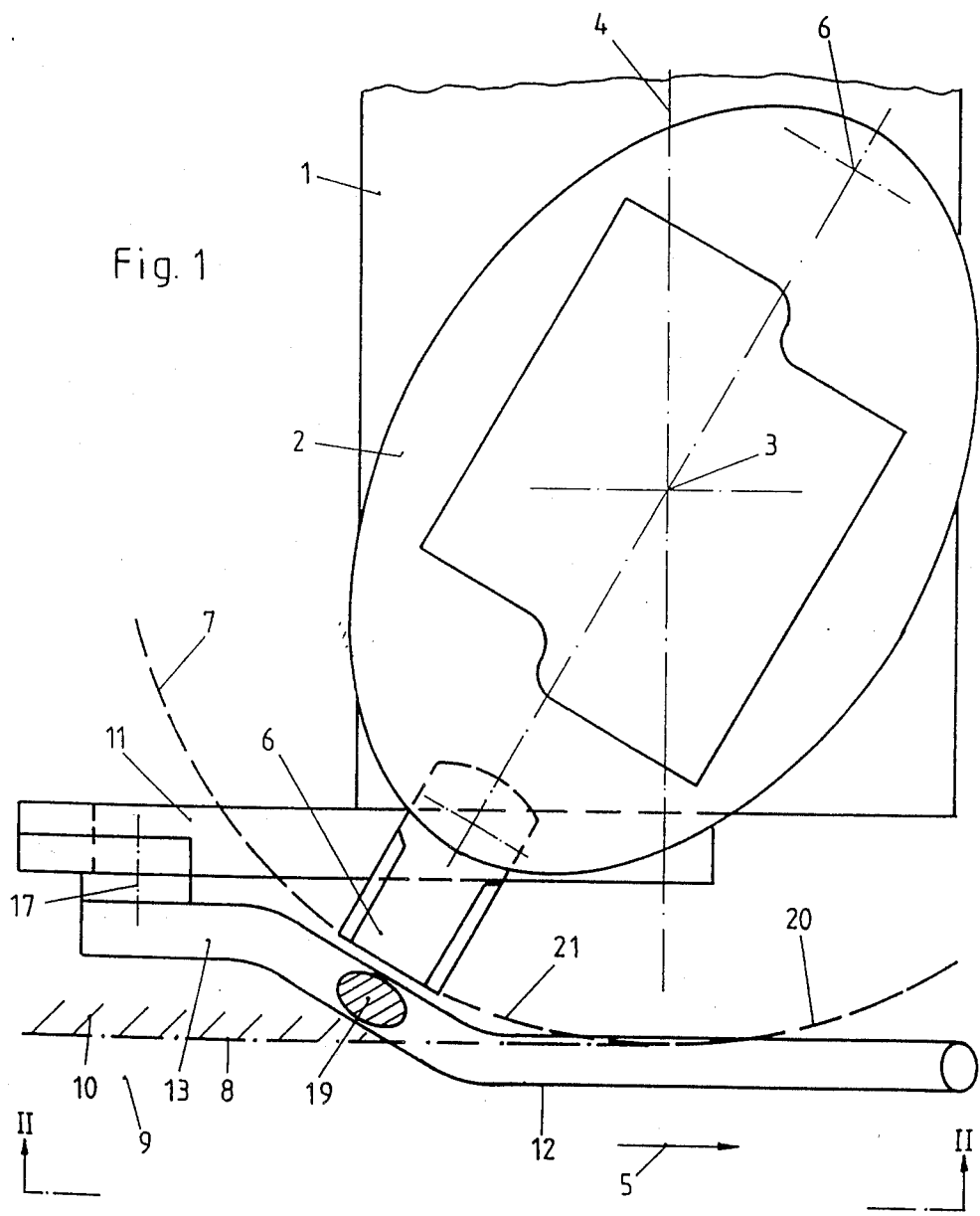

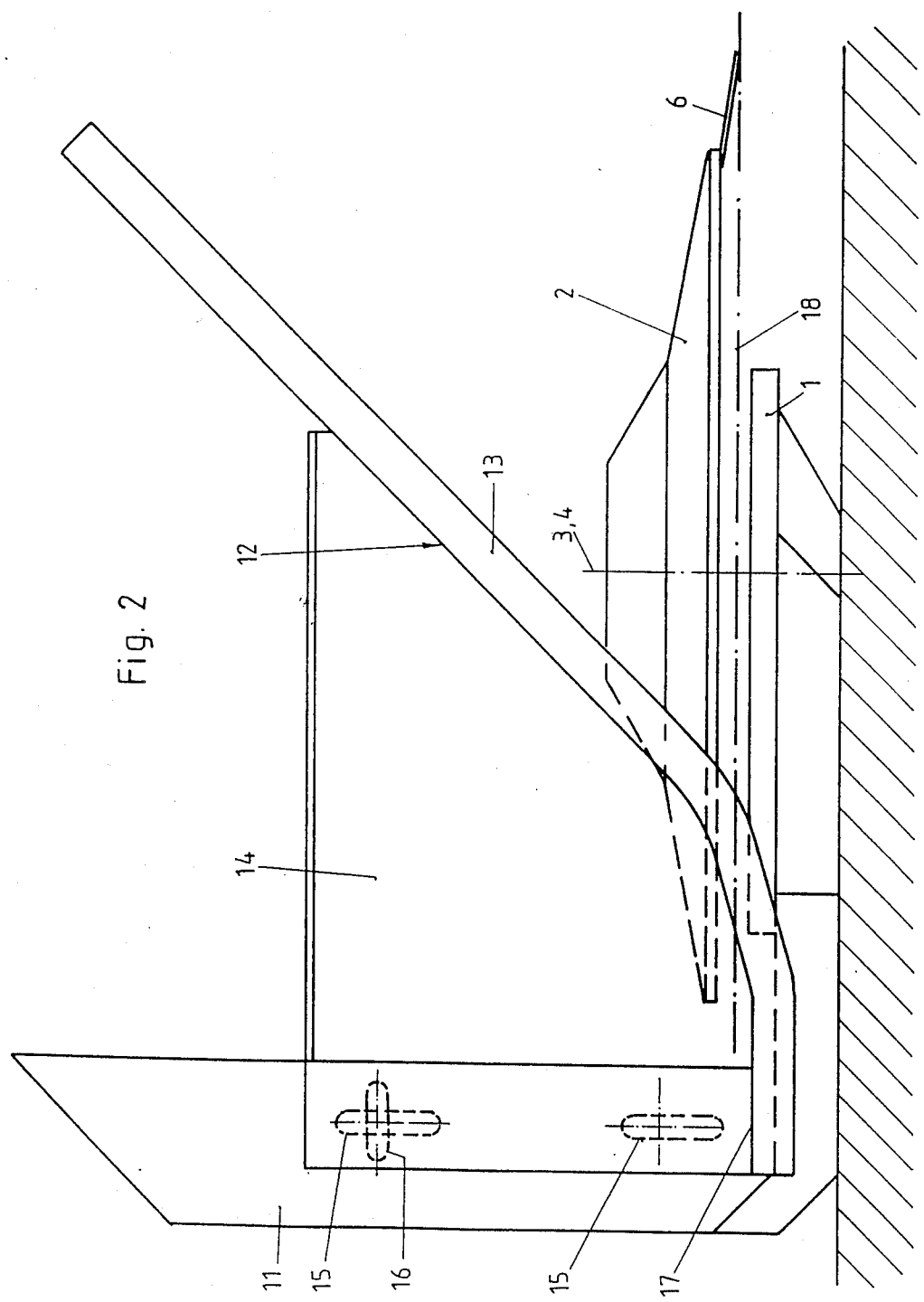

SEPARATING DEVICE FOR REAPERS WITH CUTTER PLATES DRIVEN TO ROTATE ABOUT VERTICAL AXES

BACKGROUND OF THE INVENTION

This is a continuation-in-part application of copending application Ser. No. 892,844, filed Aug. 4, 1986 now abandoned.

The invention relates to a separating device for reapers with cutter plates driven to rotate about vertical axes, with a fender which is located on the outside in the region of the outer cutter plate and which is arranged inclined downwards from a point forward of the plane defined by the axes of the cutters to divert the reaping material. Such a separating device serves for dividing off the cut reaping material from the reaping material not yet cut. Such a separating device is of particular importance when the reaping material is thickly matted and, as it were, a continuous reaping carpet is cut off horizontally during reaping.

It is known to attach a rod-like device as a fender on the outside in the region or the outer cutter plate. The rod is usually fastened to the frame or to the cutter bar and extends obliquely forwards. The fastening is such that the fender is arranged at a certain clearance distance from the region swept by the knives of the outer cutter plate and it extends obliquely upwards in the direction of travel. The reaping material is pressed downwards by a fender of this type, but not so that it passes completely into the cutting range of the outer cutter plate. On the contrary, there is a free space, through which reaping material not cut by the knives can pass to the rear. This reaping material can settle and build up in an angle where the fender is fastened. This impedes the smooth action of the reaper, and is associated with a danger of blockage in the machine as a whole.

A special problem arises when this known reaper is used for thickly matted reaping material, such as, i.e. lupines, rye grass etc. There are difficulties here because the reaper, with its horizontal cut, cuts loose from the ground, as it were, a carpet of reaping material which is, however, joined laterally to the regions not yet cut. If the tractor has a high drive power, in some cases the carpet of reaping material can be torn apart at its junction with the adjacent part not yet cut, but here again there is often a build-up on the fender, so that the tractor comes to a stop. The very tearing apart of the carpet of reaping material is very costly in terms of the force exerted and is therefore uneconomic.

One such mowing device is shown in U.S. Pat. No. 4,099,369 of Oosterling et al. The arrangement described in that patent includes a fender, the lower edge of which curves downward to intersect the cutting plane forward of the plane defined by the vertical axes of the cutter plates. As the mowing device is moved forward the crop at the edge of the cutter swath is urged down onto the cutting plane as shown in FIGS. 1, 2 and 3 of the Oosterling et al patent. It appears that two types of cuts occur, namely, a horizontal cut of the material within the cutter swath, and a "vertical" cut of the material at its edge of the swath which is bent into the cutting plane by the fender. In the Oosterling et al system, it appears that both of these cuts occur simultaneously and in the same area because the fender depresses the edge material into the cutting plane forward of the vertical cutter axis plane, into the region where the horizontal cut takes place. As pointed out in the foregoing, the net result of this type of action action is to place heavy loads on the cutters and on the reaper motive power, which at least slows down the reaping process, and can result in overload damage to one or more parts of the mechanisms.

SUMMARY OF THE INVENTION

The object on which the invention is based is to provide a separating device, by means of which cut reaping material is separated from reaping material not yet cut, and in which there is no longer any build-up of reaping material at the fastening of the fender.

According to the invention, this is achieved when the fender is arranged and designed so that, from its fastening point below the cutting plane, it passes through this cutting plane behind the vertical plane connecting the axes of the cutter plates, within the cutting track of the outer cutter plate and near to the cutting circle of the outer cutter plate, and then the fender extends forwards above the cutting plane. Thus, the carpet of reaping material already cut off - but not the carpet of reaping material not cut off - is pressed into the cutting range of the outer cutter plate and there is, as it were, a vertical cut to separate the cut carpet of reaping material from the adjacent carpet of reaping material not yet cut. However, there is no separate device used for this vertical cut but the device present in any case, which has the cutter plates and which otherwise serves for the horizontal cut. This vertical cut is particularly important where thickly matted reaping material, such as lupines, lucerne, vetches, etc., are concerned. At the same time, it is important for the arrangement of the fender that it should intersect the cutting plane behind the vertical plane formed by the axes of the cutter plates. There, a relatively large angular sector, associated with a relatively long cutting length, is available for this vertical cut or for the separating action, and the outer cutter plate is thus put to work in a region where it has hitherto not done any cutting. This means that the normal cutting work of the outer cutter plate is not overloaded by the vertical cut in its region facing forwards in the direction of travel. Consequently, a build-up in this region is also prevented. The fender is arranged and designed according to the invention so as to make skillful use of the rear semicircle of the outer cutter plate for a vertical cut. This cutter plate is therefore used in a region where hitherto it has not normally executed any cutting work during forward travel. Conversely, it thus becomes clear that the cutting work is not impeded and not overloaded by the vertical cut in the forward-facing semicircle of the outer cutter plate.

It can be appreciated from the foregoing, and will be readily apparent from the drawings, that the rear cutter semicircle, i.e., the portion of the cutter circle behind the vertical plane of the cutter axes, defines a region that has already been mowed, hence the only cut that the cutter makes in this region is the "vertical" cut. In the forward semicircle, i.e., the portion of the cutter circle forward of the vertical plane of the cutter axes, since the fender is above the cutting plane of the cutters, it does not depress the edge material into the cutting plane, as is done in the Oosterling et al arrangement, hence only the horizontal cut occurs in the forward semicircle.

The fender is arranged in such a way that its part located underneath the cutting plane extends along the vertical projection of the cutting circle of the outer cutter plate. This ensures that in this region, that is to say where the knives of the outer cutter plate operate in the rear semicircle, the carpet of reaping material is, as it were, forcibly pressed through the cutting plane and at the same time cut. Because the fender is arranged along the vertical projection of the cutting circle, that is to say approximately in a direction tangential to this over a certain peripheral angle, it is guaranteed that there is hardly any free space. Of course, the fender cannot project into the cutting circle.

The fender can consist of a bent tube. Such a component is also made correspondingly round transversely relative to the direction of travel, so that it forms no settling points for deposits of residues of reaping material.

It is also possible for the tube to be provided with a baffle and fender plate which is designed and arranged according to the curvature of the fender. On the one hand, this ensures a stiffening of the fender itself, and on the other hand the cut reaping material is divided off from the still uncut reaping material over an even larger area.

The fender can be arranged in such away that its part extending above the cutting plane is in a vertical plane approximately parallel to the direction of travel and approximately above the cutting edge. The fender is then drawn inwards in the rear or lower region. It is also possible for the fender to be arranged in such a way that its part located above the cutting plane extends forwards in an arc directed obliquely inwards.

The fender can also be arranged so as to be vertically adjustable, e.g. by means of slots. In this way, it is possible to adapt the available cutting length to different types of reaping material. The point or intersection or the fender is shifted as a result of this vertical adjusting. In all cases, however, it is located behind the vertical plane of the cutter-plate axes, specifically in the cutting track of the outer cutter plate. The fender can have a bend approximately at its point of intersection with the cutting plane, because underneath the point of intersection it should extend essentially tangentially relative to the cutting circle, whereas above the point of intersection it extends obliquely forwards. It is also possible to make the inclination of the fender adjustable, in order thereby to obtain additional adaptability to the type and consistency of the particular reaping material.

It can readily be seen that applicant's arrangement actually performs two substantially separate cuts at different areas of the cutting circle defined by the cutting plate, thereby materially reducing the load on the machine, in contrast to the prior art devices as exemplified by Oosterling et al.

BRIEF DESCRIPTION OF THE DRAWING

The invention is described further with reference to an exemplary embodiment. In the drawing:

FIG. 1 shows a plan view of the reaper and located on the same side as the cutting edge; and FIG. 2 shows a side view along the line II—II of FIG. 1.

DETAILED DESCRIPTION

FIG. 1 shows a reaper end located on the same side as the cutting edge. On a cutter bar 1 resembling a housing, several cutter plates are arranged driven to rotate about vertical axes. The outermost cutter plate 2 is driven to rotate about an axis 3. The axes 3 of all the cutter plates 2 form a vertical plane 4 extending transversely relative to the direction of travel according to the arrow 5. As is customary, the cutter plate 2 has two knives 6 merely indicated, which, forming a cutting circle 7 which is bisected by plane 4, are guided via the cutter plate 2 and are driven by the latter. When the cutter bar 1 moves in the direction or travel or working direction according to the arrow 5, a cutting edge 8 is obtained, and this divides the uncut reaping material 9 from the cut reaping material 10.

There is a frame 11 which can also engage on the free end of the cutter bar 1. Fastened to this frame 11 is a fender 12 which is composed of the bent tubular part 13 and a baffle and fender plate 14 as seen in FIG. 2 and which is fastened by means of fastening screws merely indicated so as to be adjustable in terms of height and inclination relative to the frame 11 with the aid of slots 15 and 16. One fastening point 17 of the tubular part 13 of the fender 12 is located underneath the cutting plane 18 determined by the knives 6, specifically in the gusset-shaped region between the cutting circle 7 and the cutting edge 8. In this region in which no cutting work is otherwise carried out, the tubular part 13 extends essentially tangentially relative to the cutting circle 7 and near to the cutting circle 7, as can be seen in FIG. 2. In this region, there is also the intersection point 19, at which the cutting plane 18 intersects the tubular part 13 of the fender 1. This intersection point is indicated by a broken line in FIG. 1. Above the cutting plane 18, the fender 12 or tubular part 13 is essentially inclined forwards, and it extends approximately beyond the cutting edge 8 and can be bent inwards at its free end. The baffle and fender plate 14 is angled according to the path of the tubular part 13.

The cutting circle 7 is divided by the vertical plane 4 into a front semicircle 20 and a rear semicircle 21. The cutter bar equipped with the fender 12 performs the following function.

The various cutter plates, and therefore also the outermost cutter plate 2, conventionally execute cutting work only within the front semicircle 20, when the cutter bar 1 is moved forwards according to the arrow 5. The carpet of reaping material is thereby cut horizontally and ends at the cutting edge 8. In this region, however, the cut reaping material 10 may still be thickly matted with the uncut reaping material 9, so that, to achieve a clean separation and to prevent reaping material from settling on the fender 12 or on other parts of the reaper, it is necessary to execute, as it were, another vertical cut in order to divide off the cut reaping material 10 from the uncut reaping material 9 along the cutting edge 8. This purpose is served primarily by the fender 12 which guides the carpet of reaping material through the cutting plane 18 in the region of the rear semicircle 21 of the cutting circle 7, in which conventionally no cutting work is otherwise executed, and which at the same time utilizes the knives 6, present in any case, to make this cut. So that as little uncut reaping material as possible can pass through uncut between the knife 6 and the fender 12 in the region of the intersection point 19, here the fender 12 is guided with its tubular part 13 tangential relative to the cutting circle 7 and is moved very near to the latter. Once this vertical cut has been made, the danger that reaping material will settle on the fender 12 and/or the frame 11, especially in the region of the fastening point 17, is substantially reduced. The baffle and fender plate 14 serves, in the first place, for stiffening purposes and for guiding the tubular part 13. However, in addition to this, it can also perform another separating function. The fender 12 can be fastened to the frame 11 so as to be vertically adjustable by means of the slots 15, to make it possible to adapt it to differing cutting material. Adjustment of the inclination of the fender 12 by means of the slot 16 serves the same purpose. In both cases, however, the adjusting is selected so that the point of intersection 19 of the fender 12 with the cutting plane 18 is always located in the gusset between the cutting circle 7 and cutting track 8 and does not leave this region.

From the foregoing it can be seen that two separate cuts occur, the normal horizontal cut in forward cutting semicircle 20, and the vertical cut in rear semicircle 21. These cuts thus occur at separate areas and independently of each other, the cut occurring in semicircle 21 occurring in an already mowed area, and the cut in semicircle 21 occurring without the presence of the mass of edge material. The two independent cuts place a much lighter load on the mechanism than the simultaneous single cut of the prior art arrangements.

LIST OF REFERENCE NUMERALS

1=cutter bar
2=cutter plate
3=axis
4=vertical plane
5=arrow
6=knife
7=cutting circle
8=cutting edge
9=uncut reaping material
10=cut reaping material
11=frame
12=fender
13=tubular part
14=baffle and fender plate
15=slot
16=slot
17=fastening point
18=cutting plane
19=intersection point
20=front semicircle
21=rear semicircle It should be understood that the embodiments of the invention described herein merely illustrate principles of the invetnion in a preferred form. Other modifications and variations can be made thereto without departing from the spirit and scope of the invention as set for in the claims.

I claim:

1. A separating device for use on crop reapers having cutter plates rotatable about vertical axes defining a vertical plane, with the cutter plates defining a cutting plane, the outermost cutter plate further defining a cutting track between cut and uncut crop material, and the vertical plane dividing the cutting circle of the outermost plate into forward and rear semicircles, said separating device comprising means for causing the outermost plate to make a vertical cut in a previously cut area defined by the rear semicircle and within the cutting track and a horizontal cut independent of said vertical cut in an uncut area defined by the forward semicircle.

2. A separating device as claimed in claim 1 wherein said means comprises a fender member mounted on the reaper at a mounting front behind the vertical plane, below the cutting plane, and within the cutting track, said fender member extending from below the cutting plane upwardly at an angle and passing through the cutting plane at an intersection point behind the vertical plane and within the cutting track, said fender member being completely above the cutting plane from said point forward in the direction of travel of the reaper.

3. A separating device as claimed in claim 2 wherein said fender member has a first section extending forwardly of said mounting point substantially parallel to the direction of travel of the reaper, a second section extending upwardly at an angle from said first section and passing through the cutting plane at said intersection point, the vertical projection of said second section being substantially tangential to the rear semicircle and extending across the boundary of the cutting track, and a third section extending upwardly at an angle from said second section and substantially in the direction of travel of the reaper.

4. A separating device as claimed in claim 3 wherein said first, second, and third sections are connected by bends in said fender member, the bend between said second and third sections being located approximately at the point of intersection of the fender member with the cutting plane.

5. A separating device for reapers, the reapers including a plurality or rotary cutter elements rotatable about upwardly extending axes with the axes defining a vertical plane extending across the direction of travel or the reaper and with the cutter elements each defining a cutting circle and each arranged to cut simultaneously in approximately the same lateral cutting plane, said separating device comprising a fender mounted to said reaper and defining a lower edge sloped upwardly and generally in the direction of travel of the reaper, said lower edge extending from a position behind and below the outside rotary cutter element at an angle to the direction of travel of the reaper and substantially tangential to the cutting circle of the said outside cutter element, said lower edge intersecting the cutting plane or said cutter element at a position behind the vertical plane and within the cutting path of said outside cutting element, said lower edge being totally above said cutting plane from said position forward in the direction of travel of the reaper.

6. A separating device as claimed in claim 5 wherein said fender comprises a tubular member.

7. A separating device as claimed in claim 6 wherein said tubular member has a baffle and feeder plate mounted thereto and extending from a point on said tubular member in front of the vertical plane to the rear of said fender.

8. A separating device as claimed in claim 5 wherein the portion of said lower edge of said fender above said cutting plane extends inwardly from the boundary of the cutting track.

9. A separating device as claimed in claim 5 ad further including means for varying the cutting length in the region behind the vertical plane.

10. A separation device as claimed in claim 5 and further including means for varying the angle of inclination of said fender.

11. A method of mowing crops comprising the steps of
defining a mowing track,
horizontally cutting crops growing within the mowing track,
vertically cutting portions of the crop extending across the mowing track in a region within the mowing track that has been previously mowed.

12. A method of mowing crops as claimed in claim 11 wherein the horizontal cutting takes place in a region within the mowing track separated from said previously mowed region.

* * * * *